US010757299B2

(12) United States Patent
Nobutani et al.

(10) Patent No.: US 10,757,299 B2
(45) Date of Patent: Aug. 25, 2020

(54) PROCESSING APPARATUS, MOBILE DEVICE, AND NON-TRANSITORY COMPUTER READABLE MEDIUM STORING AUTHENTICATION REQUEST PROGRAM

(71) Applicant: FUJI XEROX CO., LTD., Tokyo (JP)

(72) Inventors: Naoya Nobutani, Kanagawa (JP); Masafumi Ono, Kanagawa (JP); Manabu Hayashi, Kanagawa (JP); Toru Suzuki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 190 days.

(21) Appl. No.: 15/785,433

(22) Filed: Oct. 17, 2017

(65) Prior Publication Data

US 2018/0176419 A1 Jun. 21, 2018

(30) Foreign Application Priority Data

Dec. 16, 2016 (JP) .................................. 2016-244607

(51) Int. Cl.
*H04N 1/44* (2006.01)
*H04N 1/00* (2006.01)

(52) U.S. Cl.
CPC ....... *H04N 1/4433* (2013.01); *H04N 1/00204* (2013.01); *H04N 1/4413* (2013.01);
(Continued)

(58) Field of Classification Search
CPC ........... H04L 2209/56; H04L 2209/805; H04L 2463/102; H04L 63/0853; H04L 63/0861; H04L 9/3231
See application file for complete search history.

(56) References Cited

U.S. PATENT DOCUMENTS

2007/0285674 A1* 12/2007 Shahindoust .......... H04N 1/444
358/1.1
2008/0170256 A1* 7/2008 Matsuhara ............ G06F 3/1288
358/1.15
(Continued)

FOREIGN PATENT DOCUMENTS

JP 2015-103162 6/2015
WO WO-2016047064 A1 * 3/2016 ........... H04N 1/4413

*Primary Examiner* — Joseph P Hirl
*Assistant Examiner* — Sayed Aresh Beheshti Shirazi
(74) *Attorney, Agent, or Firm* — JCIPRNET

(57) ABSTRACT

A processing apparatus includes: a process execution unit that executes a process according to a user instruction; a first communication unit that performs wireless communication with a mobile device moved in a predetermined communication area; a recognition unit that recognizes existence/non-existence of use intention; an authentication processing unit that executes a user authentication process in cases where the first communication unit receives a user ID maintained in the mobile device and the recognition unit recognizes that the user who possesses the user ID attempts to cause the process execution unit to execute the process; and a process execution permission unit that permits the process execution unit to execute the necessary authentication process in a case where the reception user ID is recognized as the user ID possessed by the user who has the authority to cause the process execution unit to execute the necessary authentication process.

14 Claims, 13 Drawing Sheets

(52) U.S. Cl.
CPC ... *H04N 1/4426* (2013.01); *H04N 2201/0039* (2013.01); *H04N 2201/0055* (2013.01); *H04N 2201/0084* (2013.01); *H04N 2201/0094* (2013.01)

(56) References Cited

U.S. PATENT DOCUMENTS

| | | | | |
|---|---|---|---|---|
| 2009/0268227 | A1* | 10/2009 | Kaneko | G06F 3/1238 358/1.14 |
| 2013/0159021 | A1* | 6/2013 | Felsher | G06F 21/6245 705/3 |
| 2014/0002843 | A1* | 1/2014 | Miyamoto | H04N 1/00912 358/1.13 |
| 2014/0085663 | A1* | 3/2014 | Kavanappillil | G06F 3/1226 358/1.15 |
| 2014/0240747 | A1* | 8/2014 | Hirano | G06F 1/3296 358/1.14 |
| 2014/0293314 | A1* | 10/2014 | Amarendra | G06F 21/35 358/1.14 |
| 2015/0295898 | A1* | 10/2015 | Tredoux | G06F 21/608 713/176 |
| 2016/0219173 | A1* | 7/2016 | Kawai | H04L 63/102 |
| 2016/0313954 | A1* | 10/2016 | Arora | G06F 3/1238 |
| 2017/0142767 | A1* | 5/2017 | Furubayashi | H04W 76/14 |
| 2017/0187922 | A1* | 6/2017 | Koizumi | H04N 1/00204 |
| 2017/0310849 | A1* | 10/2017 | Hosoda | G06F 3/1236 |

\* cited by examiner

PROCESSING APPARATUS, MOBILE DEVICE, AND NON-TRANSITORY COMPUTER READABLE MEDIUM STORING AUTHENTICATION REQUEST PROGRAM

CROSS-REFERENCE TO RELATED APPLICATIONS

This application is based on and claims priority under 35 USC 119 from Japanese Patent Application No. 2016-244607 filed Dec. 16, 2016.

BACKGROUND

Technical Field

The present invention relates to a processing apparatus, mobile device, and a non-transitory computer readable medium storing an authentication request program.

SUMMARY

According to an aspect of the invention, there is provided a processing apparatus including: a process execution unit that executes a process according to a user instruction; a first communication unit that performs wireless communication with a mobile device which is moved in a predetermined communication area; a recognition unit that recognizes existence/non-existence of use intention in which a user attempts to cause the process execution unit to execute the process; an authentication processing unit that, in cases where the first communication unit receives a user ID maintained in the mobile device through communication with the mobile device and the recognition unit recognizes that the user who possesses the user ID attempts to cause the process execution unit to execute the process, executes a user authentication process of recognizing whether or not the user who has the reception user ID received by the first communication unit is a user who has authority to cause the process execution unit to execute the process for at least a part of necessary authentication process among processes which can be executed by the process execution unit; and a process execution permission unit that, in a case where the reception user ID is recognized by the authentication processing unit as the user ID possessed by the user who has the authority to cause the process execution unit to execute the necessary authentication process, permits the process execution unit to execute the necessary authentication process.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the invention will be described.

Figure 1:
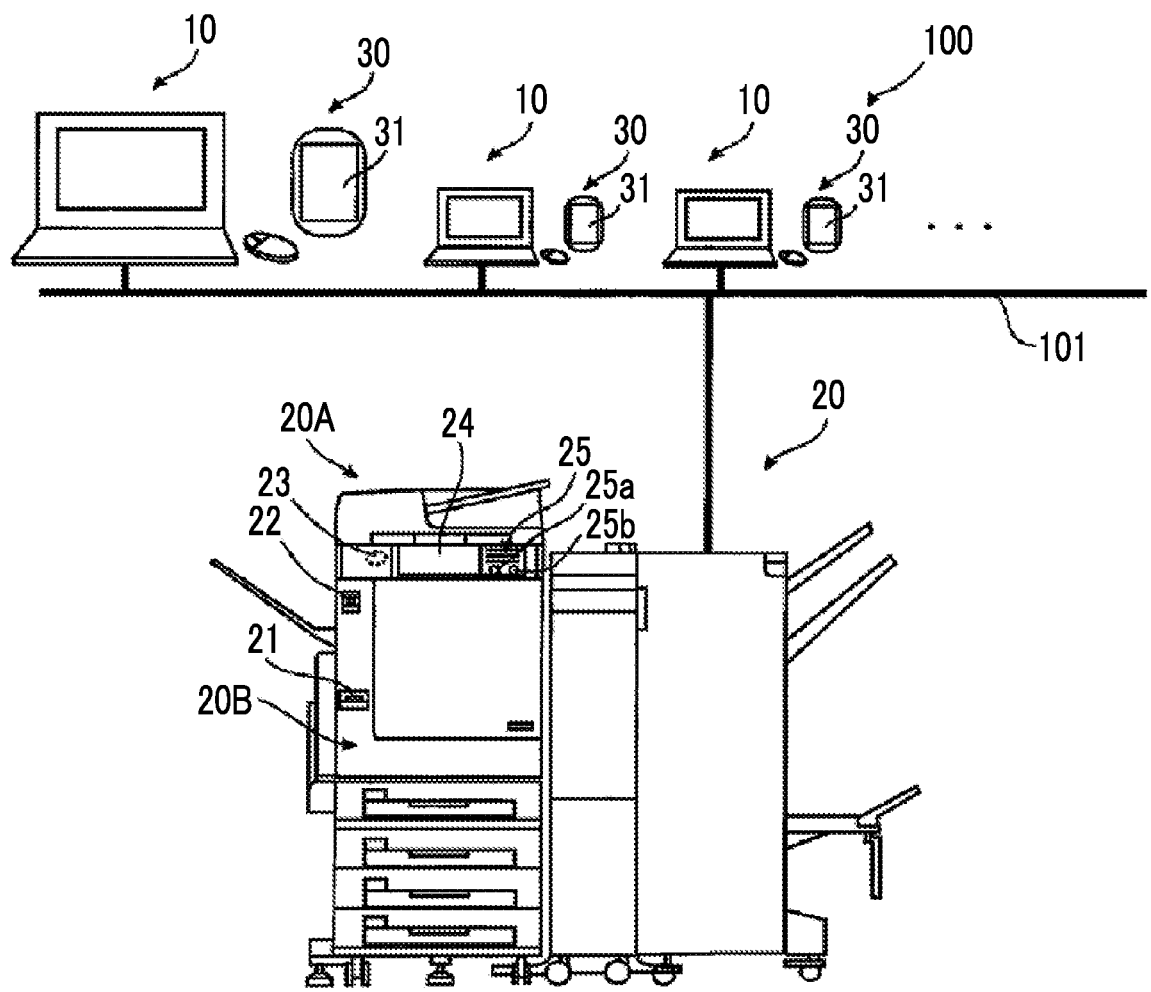
FIG. 1 is a diagram of a whole configuration of a printing system.

FIG. 1 is a diagram of a whole configuration of a printing system.

A printing system 100 includes plural note-type personal computers (hereinafter, abbreviated to "notebook PC") 10 and one multi-function machines 20. Furthermore, each of the notebook PCs 10 and each of the multi-function machines 20 are capable of communicating with each other through a communication circuit 101 such as a wireless Local Area Network (LAN).

In each notebook PC 10, a print job which instructs to print out is generated, and the print job is transmitted to the multi-function machine 20. It is possible to cause the print job to include various pieces of attached information, such as the number of copies, distinction between monochrome and color, and a size of paper used to print out, in addition to image data which is basis of printout on paper in the multi-function machine 20. In addition, the print job includes a user ID of a user who uses the notebook PC 10 of a transmission source.

In addition, the multi-function machine 20 includes a scanner 20A, a printer 20B, and the like, and has plural multiple functions such as a function as the scanner, a function as the printer, and a function as a copying machine which combines the scanner and the printer.

In addition, the multi-function machine 20 includes a pyroelectric sensor 21 and a person detection camera 22.

The pyroelectric sensor 21 is a low power consumption-type sensor which detects infrared rays, and power is always supplied to the pyroelectric sensor 21. The pyroelectric sensor 21 detects whether or not a person exists at a predetermined distance from the multi-function machine 20.

The person detection camera 22 is a camera to which power is supplied in a case where existence of a person is detected by the pyroelectric sensor 21 and which mainly captures feet of the person. The multi-function machine 20 analyzes an image of the feet acquired through capturing by the person detection camera 22, specifies current position of the person based on directions of tips of the feet and the movement of the feet, and, further, detects whether the person approaches the multi-function machine 20 or passes by the multi-function machine 20.

Furthermore, the multi-function machine 20 includes a short-range communicator 23. The short-range communicator 23, is, for example, a wireless communicator conforming to the communication standards such as BLUETOOTH (registered trademark) which has a communication distance of approximately dozens of meters.

Furthermore, the multi-function machine 20 stores a user ID list in which a name and a user ID of the user who has use authority for the multi-function machine 20 are associated.

In addition, FIG. 1 illustrates mobile devices 30 such as smart phones. Each of the mobile devices 30 has a touch panel-type display screen 31, and has a function of performing communication with the short-range communicator 23 included in the multi-function machine 20. Each user who uses the printing system 100 is requested to always carry the mobile device 30 of each user. In each mobile device 30, the user ID of the user who carries the mobile device 30 is registered.

In a case where the multi-function machine 20 receives the print job from the notebook PC 10, the multi-function machine 20 determines whether or not the print job is a print job which is transmitted by a user who has use authority for the multi-function machine 20 with reference to a user ID included in the print job. In a case of the print job which is transmitted by the user who has the use authority for the multi-function machine 20, the multi-function machine 20 accumulates the print job in the multi-function machine 20. Furthermore, in a case where the user who possesses the mobile device 30 approaches the multi-function machine 20, user authentication is performed through short-range radio communication between the mobile device 30 possessed by the user and the short-range communicator 23 of the multi-function machine 20. In a case where it is determined to be a user who has use authority for the multi-function machine 20, printout is performed based on the accumulated print job of the user according to a user instruction. In addition, in a case where the user who arrives at a place of the multi-function machine 20 is the user who has use authority for the multi-function machine 20, image data, which is acquired through reading of a document by the scanner 20A according to the user instruction, is transmitted to the notebook PC 10 of the relevant user, and printout is performed based on the image data acquired through the reading.

In addition, the multi-function machine 20 includes a touch panel 24 and a push button group 25 which includes a start button 25a, an end button 25b, and the like.

Here, the multi-function machine 20 which forms the printing system 100 corresponds to an example of a processing apparatus according to an exemplary embodiment of the invention, and each mobile device 30 corresponds to an example of a mobile device according to the exemplary embodiment of the invention.

Figure 2:
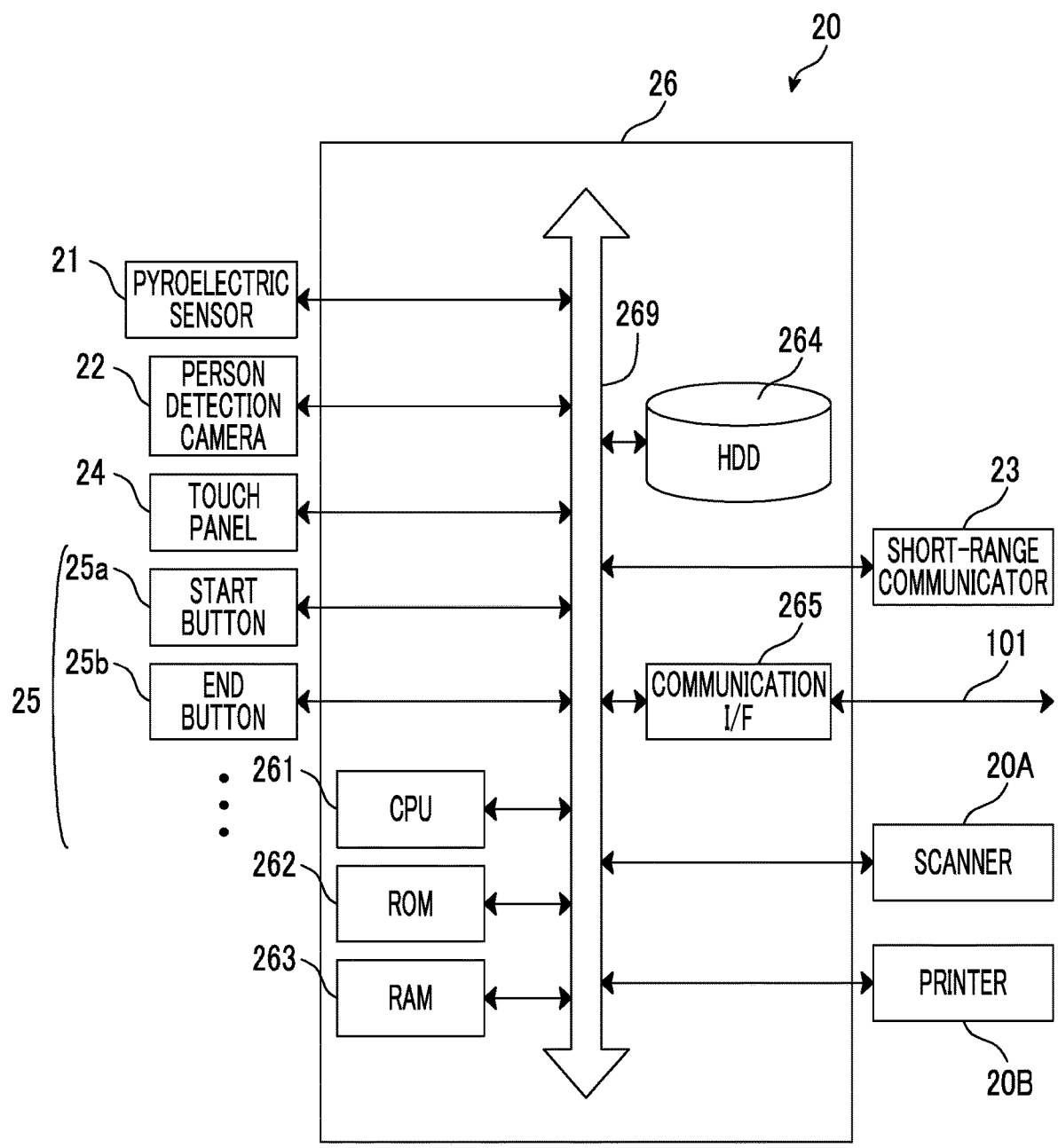
FIG. 2 is a diagram of a hardware configuration of a multi-function machine illustrated in FIG. 1.

FIG. 2 is a diagram illustrating a hardware configuration of the multi-function machine illustrated in FIG. 1.

Here, the scanner 20A, the printer 20B, the pyroelectric sensor 21, the person detection camera 22, the short-range communicator 23, the touch panel 24, the push button group 25 including various push buttons, such as the start button 25a and the end button 25b, which are also illustrated in FIG. 1, are illustrated. Furthermore, here, a main controller 26 is illustrated. The main controller 26 has a function as an information processing apparatus which executes a program. Specifically, the main controller 26 includes a CPU 261, a ROM 262, a RAM 263, an HDD 264, and a communication I/F 265. Furthermore, the CPU 261, the ROM 262, the RAM 263, the HDD 264, and the communication I/F 265 are connected to be capable of communicating with each other through a bus 269.

The CPU 261 is a central processing unit and executes a program.

The ROM 262 is a read only memory. The ROM 262 stores a part of the program which is executed by the CPU 261, integers which are referred to by the program, or the like.

In addition, the RAM 263 is a memory in which a program to be executed is read from the HDD 264 and is stored in a case where the program is executed by the CPU 261. The RAM 263 is used as a work area which stores variables that are necessary in a case where the program is executed, or the like.

In addition, the HDD 264 is a hard disk drive in which a Hard Disk (HD) is built in. The HDD 264 stores various programs which are supposed to be executed by the CPU 261 and various data which are necessary to execute the programs. In addition, the HDD 264 stores the print job or the like which is transmitted from the notebook PC 10 or the like. The user ID which is used to determine existence/non-existence of the use authority for the multi-function machine 20, a feature quantity of a face of the user, or the like is stored in the HDD 264.

Furthermore, the communication I/F 265 is a communication interface which performs communication with the notebook PC 10 through the communication circuit 101 illustrated in FIG. 1.

Figure 3:
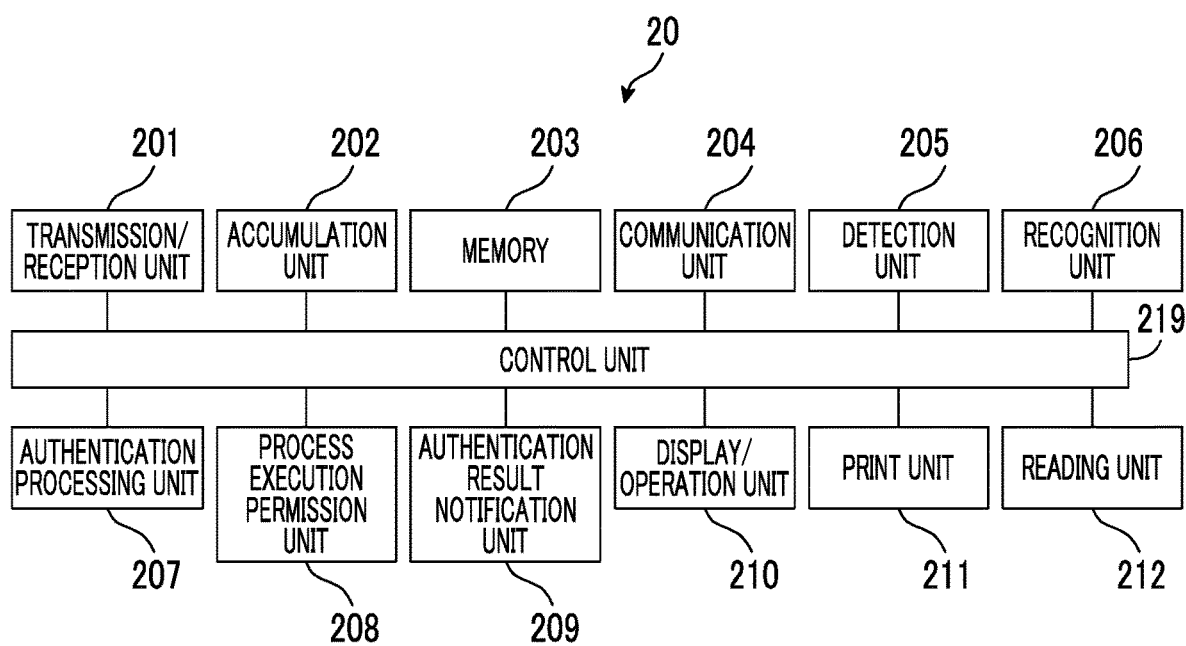
FIG. 3 is a functional block diagram of the multi-function machine illustrated in FIG. 1.

FIG. 3 is a functional block diagram of the multi-function machine illustrated in FIG. 1. Here, functions of the multi-function machine 20 will be generally described.

The multi-function machine 20 is a device which is requested to confirm a processing request from the user who has authority to cause the multi-function machine 20 to execute a process, such as print or copy, before execution and which executes a process according to the user instruction.

FIG. 3 illustrates a transmission/reception unit 201, an accumulation unit 202, a memory 203, a communication unit 204, a detection unit 205, a recognition unit 206, an authentication processing unit 207, a process execution permission unit 208, an authentication result notification unit 209, a display/operation unit 210, a printing unit 211, a reading unit 212, and a control unit 219 as functional components of the multi-function machine 20.

The transmission/reception unit 201 receives a print job which is an instruction to print out and is transmitted from the notebook PC 10 (see FIG. 1) through the communication circuit 101. The print job includes the user ID which specifies the user who transmits the print job. The print job received by the transmission/reception unit 201 is transmitted to the accumulation unit 202 through the control unit 219, and is stored in the accumulation unit 202. In addition, the transmission/reception unit 201 transmits data, which is read and acquired by the reading unit 212 (scanner 20A), to the notebook PC 10. The communication I/F 265 illustrated in FIG. 2 mainly takes a role as the transmission/reception unit 201 on the hardware.

In addition, the accumulation unit 202 accumulates the print job received by the transmission/reception unit 201 until printout is executed by the printing unit 211 based on the print job. The HDD 264 illustrated in FIG. 2 mainly takes a role as the accumulation unit 202 on the hardware.

In addition, the memory 203 stores the user ID list in which a name of each user is associated with a user ID of each user who has use authority to use the multi-function machine 20. The HDD 264 illustrated in FIG. 2 takes a role as the memory 203 on the hardware. The memory 203 corresponds to an example of a first memory according to the exemplary embodiment of the invention.

In addition, the communication unit 204 performs wireless communication with the mobile device 30 which is possessed by the user, which is in a short distance from the multi-function machine 20, and which is moved in a predetermined communication area. The short-range communicator 23 illustrated in FIGS. 1 and 2 takes a role as the communication unit 204 on the hardware. The communication unit 204 corresponds to an example of a first communication unit according to the exemplary embodiment of the invention.

In addition, the detection unit 205 separately detects movement of the user according to whether the user passes by the multi-function machine 20 or the user comes toward the multi-function machine 20. The CPU 261 or the like, which executes a program for distinguishing whether the user passes by the multi-function machine 20 or the user comes toward the multi-function machine 20 based on the pyroelectric sensor 21 and the person detection camera 22, which are illustrated in FIGS. 1 and 2, and the directions and movement of the tips of the feet of the user in the image captured by the person detection camera 22, takes a role as the detection unit 205 on the hardware. The detection unit 205 corresponds to an example of a detection unit according to the exemplary embodiment of the invention.

In addition, a recognition unit 206 recognizes existence/non-existence of "use intention" which indicates that the user attempts to use the multi-function machine 20. The recognition unit 206 according to the exemplary embodiment recognizes the existence/non-existence of use intention through combination of two recognition processes. One of the recognition processes is a process of recognizing (presuming) that the user has the use intention based on a fact that the user comes toward the multi-function machine 20 is detected by the detection unit 205. A remaining recognition processes is a process of, in a case where it is recognized (presumed) that the user has the use intention, subsequently, causing the communication unit 204 to transmit an inquiry about the existence/non-existence of use intention toward the mobile device 30 of the user and to receive a reply to the inquiry from the mobile device 30. Furthermore, in a case where the received reply is a reply indicative of the existence of the existence of the use intention, the recognition unit 206 definitely recognizes that the user has the use intention. The main controller 26, which includes the CPU 261 or the like that executes a program of performing the recognition process, takes a role as the recognition unit 206 on the hardware.

In addition, in a case where it is recognized that the user has the use intention for the multi-function machine 20 by the recognition unit 206 and the communication unit 204 receives the user ID through communication with the mobile device 30 possessed by the user, the authentication processing unit 207 executes a user authentication process of recognizing whether the user who possesses the user ID is a user who has authority to use the multi-function machine 20 based on the user ID received by the communication unit 204. The user authentication process according to the exemplary embodiment is a process of determining whether the user ID received by the communication unit 204 is identical (success in recognition) or not (failure in recognition) with any one of the user IDs of the user ID list stored in the memory 203. A main controller 26, which includes the CPU 261 or the like that executes a program of performing the user authentication process, takes a role as the authentication processing unit 207 on the hardware. The authentication processing unit 207 corresponds to an example of an authentication processing unit according to the exemplary embodiment of the invention.

In addition, in a case where user authentication performed by the authentication processing unit 207 is successful, that is, it is confirmed that the user ID received by the communication unit 204 is identical to any one of the user IDs in the user ID list stored in the memory 203, the process execution permission unit 208 permits to execute the process such as print or copy. Similar to the authentication processing unit 207, the main controller 26 mainly takes a role as the process execution permission unit 208 on the hardware.

Furthermore, the authentication result notification unit 209 causes the communication unit 204 to notify the authentication processing unit 207 of a result of the user authentication process, that is, success or failure in the user authentication to the mobile device 30, which is a current communication partner, through wireless communication. Similar to the authentication processing unit 207 and the process execution permission unit 208, the main controller 26 mainly takes a role as the authentication result notification unit 209 on the hardware.

In addition, the display/operation unit 210 takes a role of notifying the user of various pieces of information, through screen display and receiving various instructions from the user through the user operation. Here, the user operation in the display/operation unit 210 includes press of the start button 25a which instructs to execute print and copy and press of the end button 25b which notifies a fact that the use of the multi-function machine 20 is finished to the multi-function machine 20. The touch panel 24 and the push button group 25 take a role as the display/operation unit 210 on the hardware.

In addition, the printing unit 211 performs printout on paper. That is, the printing unit 211 performs printout based on the print jobs accumulated in the accumulation unit 202 based on the user instruction. The printer 20B illustrated in FIGS. 1 and 2 takes a role as the printing unit 211 on the hardware. The printing unit 211 becomes a part of a process execution unit according to the exemplary embodiment of the invention.

In addition, the reading unit 212 takes a role of reading an image on the document and acquiring the image data. The image data acquired by the reading unit 212 is transmitted to the notebook PC 10 through the transmission/reception unit 201 or transmitted to the printing unit 211 and an image is printed out based on the image data. The scanner 20A illustrated in FIGS. 1 and 2 takes a role as the reading unit 212 on the hardware. The reading unit 212 forms an example of a process execution unit according to the exemplary embodiment of the invention, together with the printing unit 211.

Furthermore, the control unit 219 is in charge of controlling the whole of the multi-function machine 20 and delivering data and commands.

Figure 4:
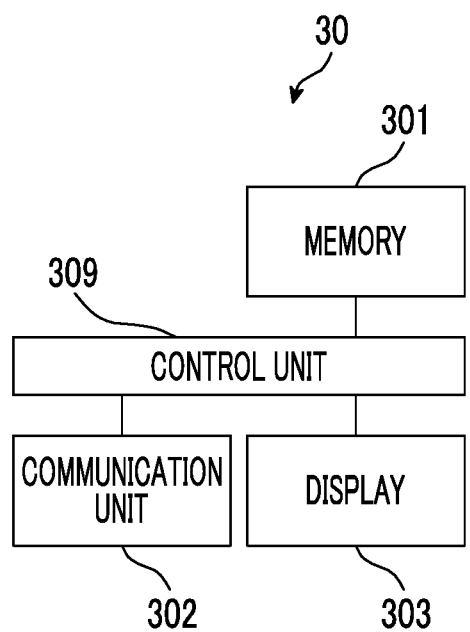
FIG. 4 is a functional block diagram of a mobile device illustrated in FIG. 1.

FIG. 4 is a functional block diagram of the mobile device illustrated in FIG. 1.

The mobile device 30 is a device which is possessed by the user, maintains a user ID indicating that the user is a user who has use authority to use the multi-function machine 20, and performs wireless communication with the multi-function machine 20 in a case where the mobile device 30 is moved in a communication area in the vicinity of the multi-function machine 20. In addition, in the mobile device 30, a function is embedded as the information processing apparatus which includes the CPU or the like that executes programs, and various programs are executed.

FIG. 4 illustrates a memory 301, a communication unit 302, a display 303, and a control unit 309 as components of the mobile device 30.

The memory 301 stores the user ID of the user who possesses the mobile device 30. The memory 301 corresponds to an example of a second memory of the mobile device according to the exemplary embodiment of the invention.

In addition, the communication unit 302 performs wireless communication with the multi-function machine 20 in a case where the mobile device 30 is moved in the communication area with respect to the multi-function machine 20. Furthermore, the communication unit 302 transmits the user ID stored in the memory 301 to the multi-function machine 20. The communication unit 302 corresponds to an example of a second communication unit according to the exemplary embodiment of the invention. For example, a short-range communication function, such as BLUETOOTH (registered trademark), included in the mobile device 30 takes a role as the communication unit 302 on the hardware.

Furthermore, the display 303 receives success or failure in the user authentication which is transmitted from the multi-function machine 20 by the communication unit 302, and displays a result of the success or failure in the user authentication received by the communication unit 302 on the display screen 31. The CPU or the like, which executes a program of performing display on the display screen 31, takes a role as the display 303 on the hardware. The display 303 corresponds to an example of a report unit according to the exemplary embodiment of the invention.

Furthermore, the control unit 309 controls the whole of the mobile device 30 and is in charge of delivering data and commands.

Hereinafter, a process executed in the multi-function machine 20 and the mobile device 30 will be described in detail by describing various programs which are executed in the multi-function machine 20 or the mobile device 30. Here, in description below, a general term of a program which is executed in the multi-function machine 20 corresponds to an example of a process control program according to the exemplary embodiment of the invention, and a general term of a program which is executed in the mobile device 30 corresponds to an example of an authentication request program according to the exemplary embodiment of the invention.

Figure 5:
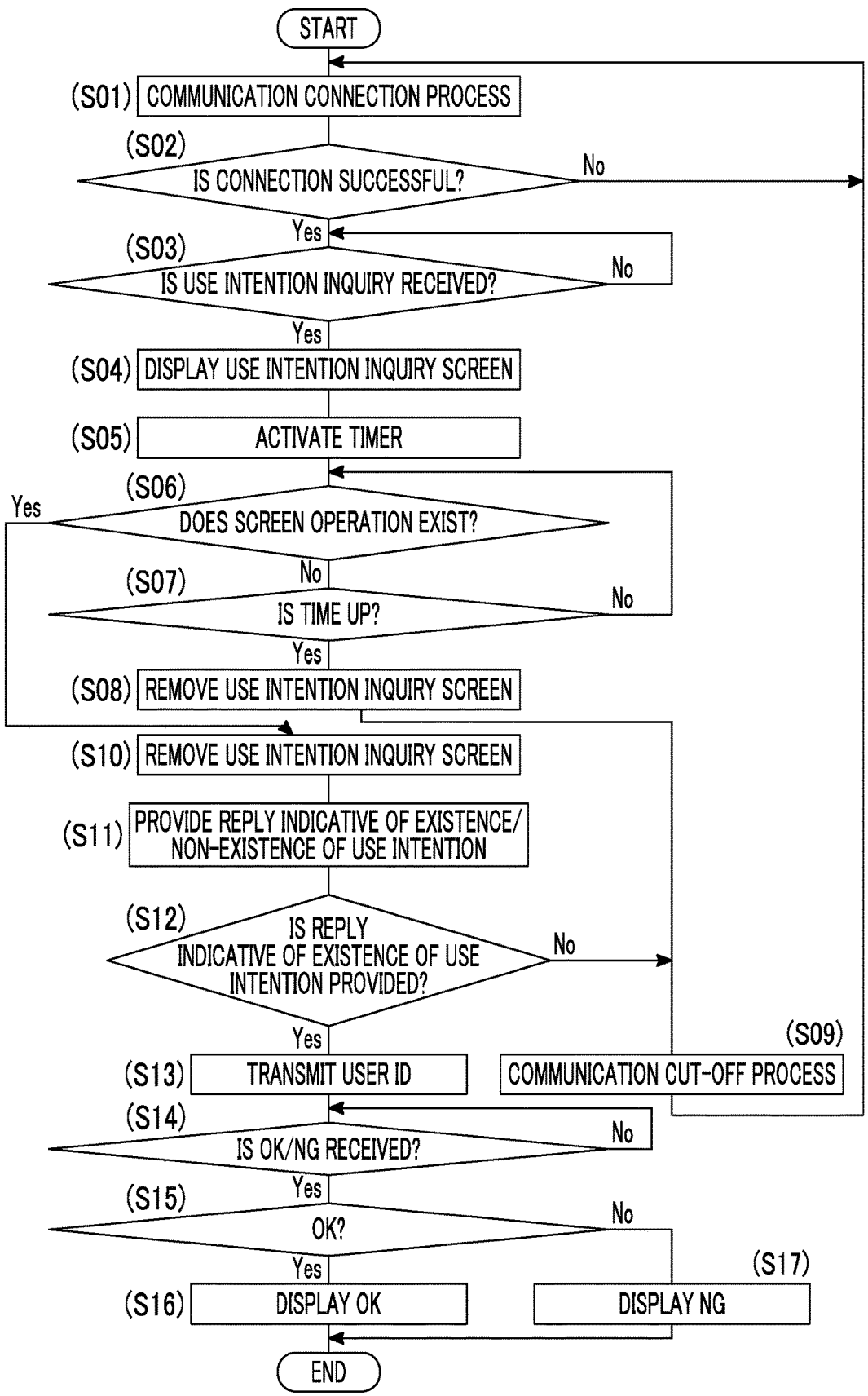
FIG. 5 is a flowchart of a process setting program executed in the mobile device.

FIG. 5 is a flowchart illustrating the process setting program which is executed in the mobile device.

In the mobile device 30, whether a target multi-function machine 20 does not exist in the communication area is always monitored by the polling process (step S01). Furthermore, in a case where connection of the short-range communication with the target multi-function machine 20 is successful (step S02), a state of waiting for reception of the use intention inquiry transmitted from the multi-function machine 20 is made (step S03). In the multi-function machine 20, the use intention inquiry is performed toward the mobile device 30 in step S37 of FIG. 10 which will be described later.

In a case where the use intention inquiry from the multi-function machine 20 is received (step S03), the use intention inquiry screen is displayed on the display screen 31 of the mobile device 30 (step S04).

Figure 6:
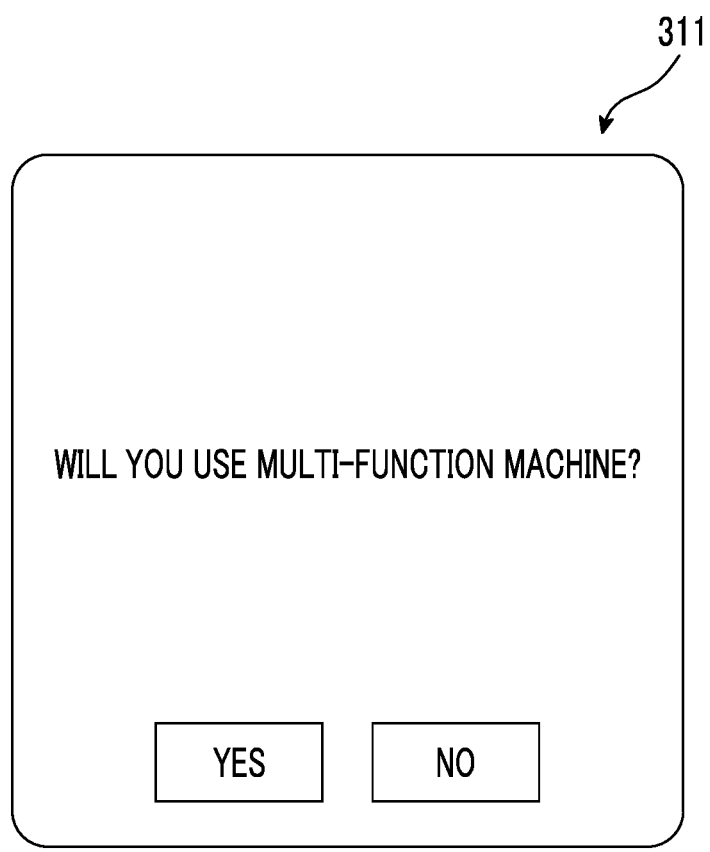
FIG. 6 is a diagram illustrating a use intention inquiry screen displayed on a display screen of the mobile device.

FIG. 6 is a diagram illustrating the use intention inquiry screen displayed on the display screen of the mobile device.

A question "will you use the multi-function machine?" and "Yes" and "No" buttons are displayed on the use intention inquiry screen 311 illustrated in FIG. 6. In a case where the "Yes" button is pressed, a user intention of attempting to use the multi-function machine 20 is notified to the multi-function machine 20. In a case where the "No" button, a user intention of not using the current multi-function machine 20 (for example, only passing nearby) is notified to the multi-function machine 20.

Description will be continued after returning to FIG. 5.

In a case where the use intention inquiry screen 311 illustrated in FIG. 6 is displayed in step S04, subsequently, a timer is activated (step S05). The timer is a timer which counts time until the use intention inquiry screen 311 is removed in a case where neither the "Yes" button nor the "No" button is pressed on the use intention inquiry screen 311 displayed on the display screen 31.

After the timer is activated (step S05), whether or not a button operation is performed on the use intention inquiry screen 311 (step S06) and whether or not time is up (step S07) are monitored. Furthermore, in a case where time is up while the button operation is not performed on the use intention inquiry screen 311, the use intention inquiry screen 311 is removed (step S08). Furthermore, a communication cut-off process is performed (step S09), and the process returns to a communication connection process (step S01).

Here, in a case where the process directly proceeds to the communication connection process (step S01) after the communication cut-off process (step S09) is performed, there is a problem in that the user who possesses the mobile device 30, which is a target of the current communication cut-off process, still stays in the communication area and thus communication with the same mobile device 30 is connected again during the time. Therefore, after the communication cut-off process (step S09) is performed, a subsequent communication connection process (step S01) is started a little later.

In a case where a screen operation ("Yes" button is pressed or the "No" button is pressed) is performed (step S06) while the use intention inquiry screen 311 is displayed on the display screen 31 of the mobile device 30, the use intention inquiry screen 311 is removed from the display screen 31 in this case (step S10), and the existence/non-existence of use intention is replied to the multi-function machine 20 (step S11). Meanwhile, in the case where time is up (step S07), the reply for the existence/non-existence of use intention is not provided to multi-function machine 20. However, in this case, it is regarded that the use intention does not exist for the multi-function machine 20.

In a case where the reply in step S11 is a reply which indicates the non-existence of the use intention by pressing the "No" button (step S12), the process proceeds to step S09, and the communication cut-off process is performed, and the communication connection process is started a little later (step S01).

In contrast, in a case where the reply in step S11 is a reply which indicates the existence of the use intention by pressing the "Yes" button (step S12), the user ID preserved in the mobile device 30 (stored in the memory 301 illustrated in FIG. 3) is transmitted to the multi-function machine 20 (step S13), and a state of waiting for reception of OK/NG is made (step S14). In a case where the multi-function machine 20 receives both the reply of the existence of the use intention of the mobile device 30 and a subsequent user ID are received, a user authentication process of detecting whether or not the same user ID as the received user ID exists in the user ID list of the user who has the use authority for the multi-function machine 20 is executed (step S45 of FIG. 11). Furthermore, in a case where the user authentication is successful, "OK" is transmitted to the mobile device 30 (step S49 of FIG. 11). In contrast, in a case where the user authentication fails, "NG" is transmitted to the mobile device 30 (step S47 FIG. 11).

In a case where the mobile device 30 receives the OK/NG (step S14 of FIG. 5), "OK display" (step S16) or "NG display" (step S17) is performed on the display screen 31 of the mobile device 30 according to whether reception content is "OK" or "NG" (step S15), and notifies a fact that the multi-function machine 20 can be used or cannot be used to the user who possesses the mobile device 30 through the display.

Figure 7:
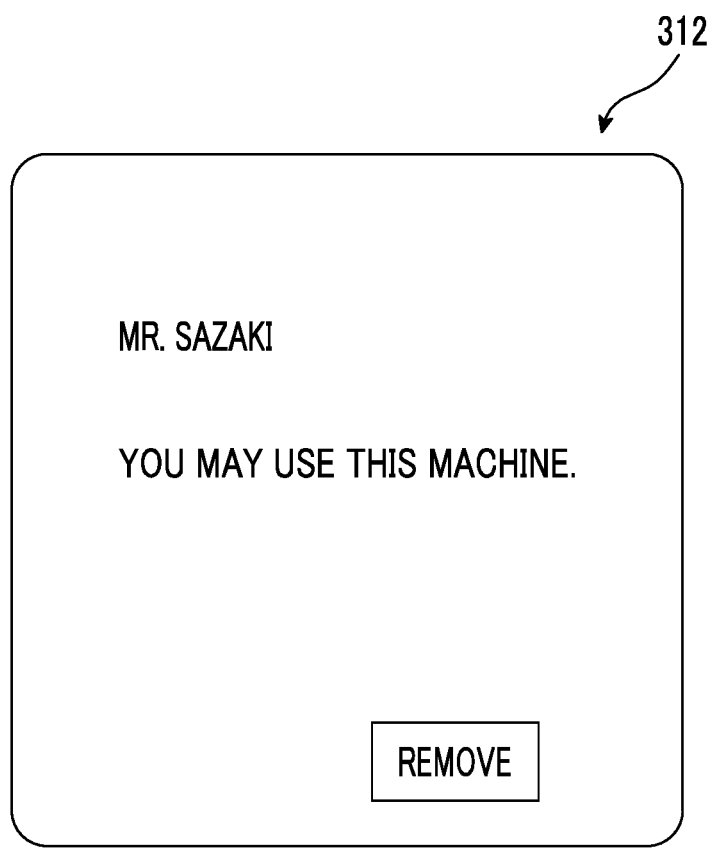
FIG. 7 is a diagram illustrating an OK screen displayed in step S16 of FIG. 5.

FIG. 7 is a diagram illustrating an OK screen displayed in step S16 of FIG. 5.

On the OK screen 312 illustrated here, a name of a current user (here, Mr. SAZAKI) and a message "You may use this machine.", which permits the use of the multi-function machine 20, are displayed.

In a case where a "remove" button on the OK screen 312 is pressed, the OK screen 312 disappears from the display screen 31 of the mobile device 30.

Figure 8:
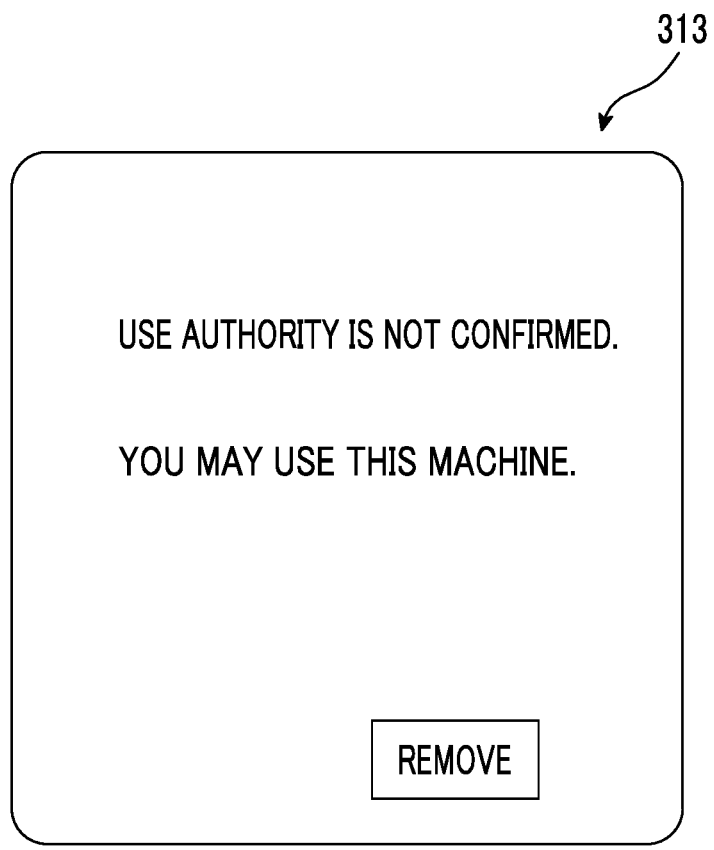
FIG. 8 is a diagram illustrating an NG screen displayed in step S17 of FIG. 5.

FIG. 8 is a diagram illustrating an NG screen which is displayed in step S17 of FIG. 5.

A message "Use authority is not confirmed. Please refrain from using" which denies the use of the multi-function machine 20 is displayed on an NG screen 313 illustrated here. In a case where a "remove" button on the NG screen 313 is pressed, the NG screen 313 disappears from the display screen 31 of the mobile device 30.

Figure 9:
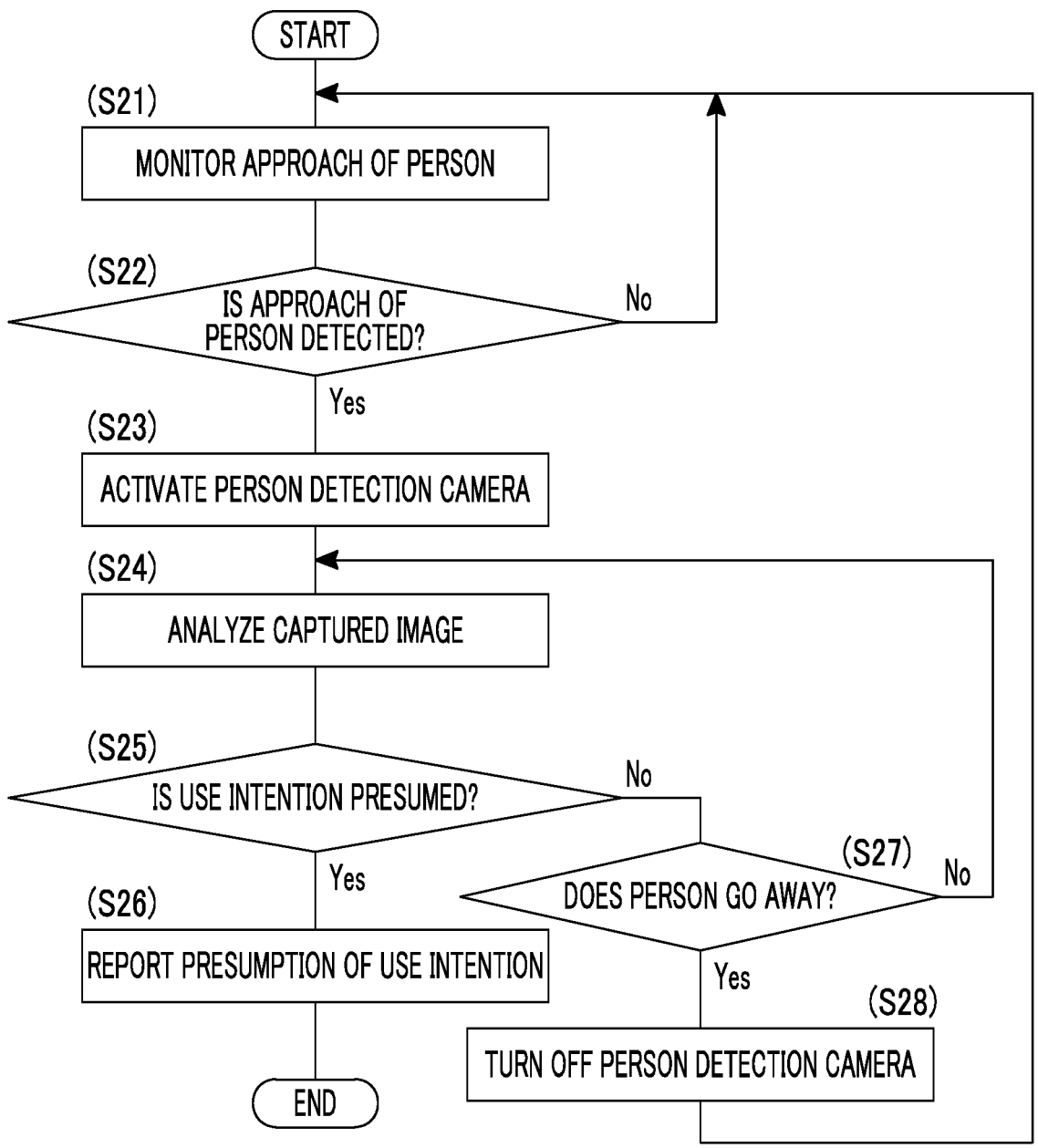
FIG. 9 is a flowchart illustrating a use intention presumption program which is executed in the multi-function machine.

FIG. 9 is a flowchart illustrating a use intention presumption program which is executed in the multi-function machine.

Here, approach of a person to the multi-function machine 20 is monitored by the pyroelectric sensor 21 illustrated in FIGS. 1 and 2 (step S21). Furthermore, in a case where the approach of a person is detected (step S22), the person detection camera 22 is activated (step S23), and a captured image is analyzed (step S24). Here, a current position and a movement direction of the person are analyzed based on an image acquired by capturing the feet of the person. Furthermore, it is presumed whether the person comes to the multi-function machine 20 and attempts to use the multi-function machine 20 or the person attempts to pass by the multi-function machine 20 based on the analysis.

In a case where it is presumed that the use intention exists (step S25), presumption of the existence of the use intention is reported (step S26).

In contrast, in a case where the person goes away while the presumption of the existence of the use intention is not performed, that is, it is presumed that the person attempts to simply pass by the multi-function machine 20 (step S27), the person detection camera 22 is turned off (step S28), and the process returns to the step of monitoring the approach of a person (step S21).

Figure 10:
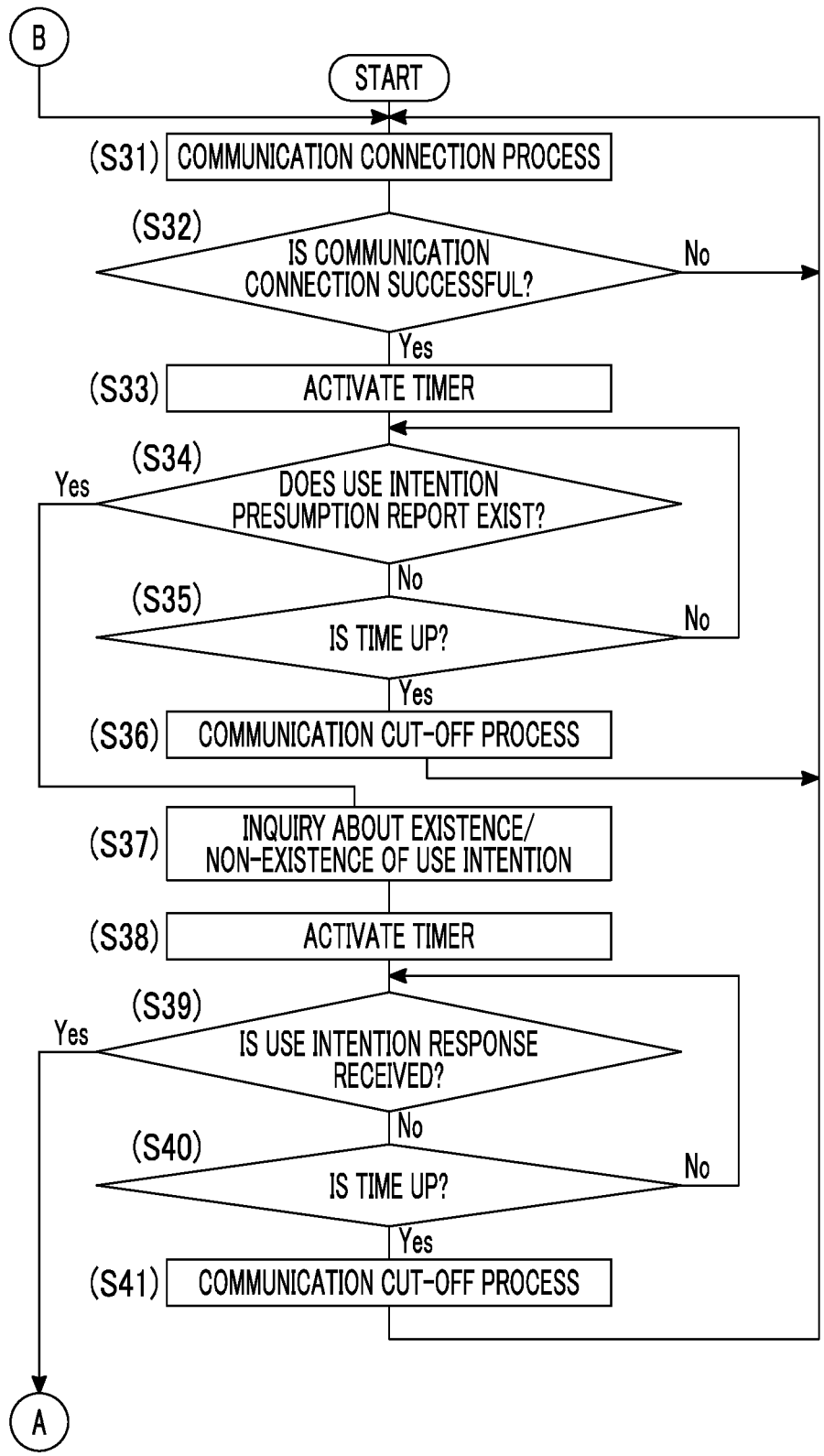
FIG. 10 is a flowchart illustrating a former part of a process control program.
Figure 11:
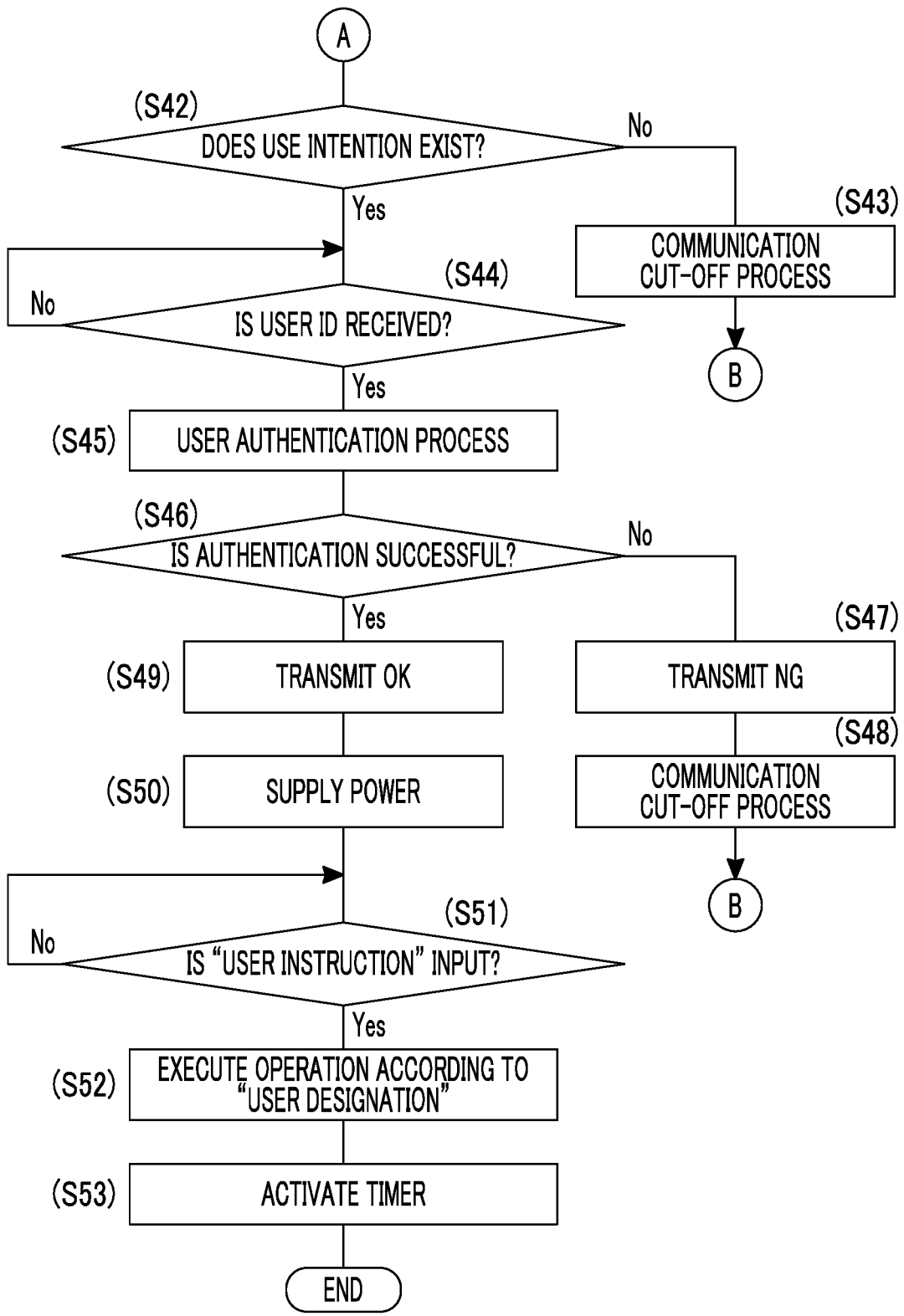
FIG. 11 is a flowchart illustrating a latter part of the process control program.

FIGS. 10 and 11 are flowcharts illustrating the process control program, and illustrating a former part and a latter part, respectively. Similar to the use intention presumption program illustrated in FIG. 9, the process control program is a program which is executed in the multi-function machine 20.

In the multi-function machine 20, in a case where the mobile device 30 which moves in the communication area of the short-range communicator 23 exists, the communication connection process performed with the mobile device 30 is performed (step S31). Furthermore, in a case where communication connection is successful (step S32), the timer is activated (step S33). The timer is a timer used to count a time-limit for use intention presumption report waiting. The use intention presumption report is a report performed in step S26 of the use intention presumption program illustrated in FIG. 9. In a case where the use intention presumption report does not exist until the time-up of the timer activated in step S33 (step S35), the communication cut-off process is performed (step S36), and the process returns to the communication connection process performed with the mobile device 30 (step S31). Here, the mobile device 30, which is a partner in a case where the communication cut-off process is performed in step S36, is excluded from the target of the communication connection process (step S31) for a while. The communication connection process (step S31) performed with another mobile device 30 is immediately started. The communication cut-off process is performed in the same manner in steps S41, S43, and S48 which will be described later.

In a case where the use intention presumption report is provided (step S34) before time of the timer activated in step S33 is up (step S35), an inquiry about the existence/non-existence of the use intention is provided to the mobile device 30 (step S37). In the mobile device 30, in a case where the inquiry about the existence/non-existence of the use intention is provided, the use intention inquiry screen 311 illustrated in FIG. 6 is displayed on the display screen 31 of the mobile device 30 which has received the inquiry (step S04 of FIG. 5), as described above.

After the inquiry about the existence/non-existence of the use intention is performed (step S37), the timer is activated (step S38) on the side of the multi-function machine 20. The timer is a timer used to count a time-limit for response waiting with respect to the inquiry about the existence/non-existence of the use intention (step S37).

In a case where time of the timer activated in step S38 is up (step S40) before a response indicative of the existence/non-existence of the use intention is received (step S39), the communication cut-off process is performed (step S41), and the process returns to the communication connection process in step S31. In contrast, in a case where the response indicative of the existence/non-existence of the use intention is provided (step S39) before time of the timer activated in step S38 is up, it is determined whether the response is a response indicative of the existence of the use intention or a response indicative of the non-existence of the use intention (step S42 of FIG. 11). In a case of the non-existence of the use intention, the communication cut-off process is performed (step S43) similar to the case where the response is not provided, and the process returns to the communication connection process in step S31. In contrast, in a case where the received response is the response indicative of the existence of the use intention (step S42), a state of waiting for reception of the user ID transmitted from the mobile device 30 (step S13 of FIG. 5) is made (step S44). In a case where the user ID is received (step S44), the user authentication process is executed (step S45).

The user authentication process according to the exemplary embodiment is a process of detecting whether or not the same user ID as the received user ID is identical to any one of user IDs, which are registered in the multi-function machine 20 (stored in the memory 203 of FIG. 3) as the users who have authority to use the multi-function machine 20, in the user ID list, determining to be the success in authentication in a case where an identical user ID exists, and determining to be the failure in authentication in a case where the identical user ID is not found.

In a case of the failure in authentication (step S46) as a result of the user authentication process, an NG response relevant to the user ID is transmitted (step S47), furthermore, communication with the currently connected mobile device 30 is cut off (step S48), the process returns to step S31, and the communication connection process is executed with another mobile device 30.

In contrast, in a case of the success in authentication (step S46) as the result of the user authentication process, an OK response relevant to the user ID is transmitted to the mobile device 30 which is the current communication partner (step S49), and power is supplied to the multi-function machine 20 (step S50). Meanwhile, as described above, power is always supplied to some spots of the multi-function machine 20, and thus, here, the supply of power indicates the supply of power to remaining spots.

Subsequently, in a case where the touch panel 24 and the push button group 25 (see FIGS. 1 and 2) of the multi-function machine 20 are operated by the user, a process which is caused to be executed by the multi-function machine, for example, an instruction (user instruction) for the copy process and the print process is provided. That is, for example, with regard to the copy process, the number of copies, distinction between monochrome and color, a size of paper, and the like are set and, finally, an operation of pressing the start button 25a is performed (step S51). If so, in the multi-function machine 20, an operation according to the "user instruction" is executed (step S52) with the press of the start button 25a as a trigger, and, further, the timer is activated (step S53). The timer will be described in subsequent description with reference to FIG. 12.

Figure 12:
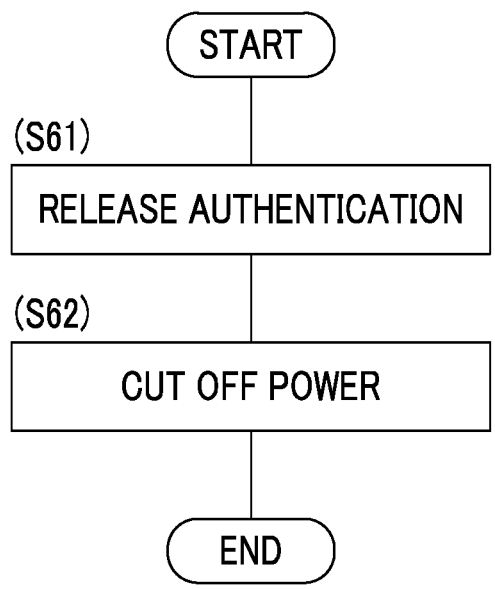
FIG. 12 is a flowchart illustrating a power interruption program.

FIG. 12 is a flowchart illustrating a power interruption program.

The power interruption program is a program which is executed in the multi-function machine 20 in a case where time of the timer activated in step S53 of FIG. 11 is up or the end button 25b (see FIGS. 1 and 2) included in the multi-function machine 20 is pressed.

Here, first, the authentication is released (step S61). The reason for this is to avoid illegal use of the multi-function machine 20 by another user in a case where power is subsequently supplied to the multi-function machine 20 and information of success in authentication of a previous user remains.

Here, subsequently, power which is supplied to the multi-function machine 20 is cut off (step S62). However, as described above, power supply to maintain the communication function or the like with the mobile device 30 is continued.

Here, the user who has used the multi-function machine 20 presses the end button 25b in a case where the user leaves the place of the multi-function machine 20. If so, the power interruption program illustrated in FIG. 12 is executed and power of the multi-function machine 20 is cut off. However, it is conceivable that the user forgets to press the end button 25b and leaves the place of the multi-function machine 20. In this case, the power of the multi-function machine 20 is cut off after waiting for the timer activated in step S54 of FIG. 11 to time up.

Meanwhile, although not described in the flowchart, for example, it is conceivable that the user leaves while the touch panel 24 is being operated. Therefore, even in a case where predetermined time elapses without performing any operation on the multi-function machine 20, the power interruption program of FIG. 12 is executed and the power of the multi-function machine 20 is cut off.

Here, in a case of the exemplary embodiment which has been described so far, an image captured by the person detection camera 22 is analyzed, and the existence/non-existence of use intention is recognized (presumed) based on the direction and movement of the tips of the feet of the user. In a case where the existence of the use intention is presumed, subsequently, the inquiry about the existence/non-existence of the use intention is provided to the mobile device 30 of the user, and recognition of the existence/non-existence of use intention is decided based on the reply to the inquiry. However, only the presumption may be used as a process of recognizing the intention of using the multi-function machine 20 or the inquiry about the existence/non-existence of the use intention may be provided to the mobile device 30 of the user, which is moved in the communication area, without performing the presumption.

Subsequently, another form of the user authentication process will be described.

Figure 13:
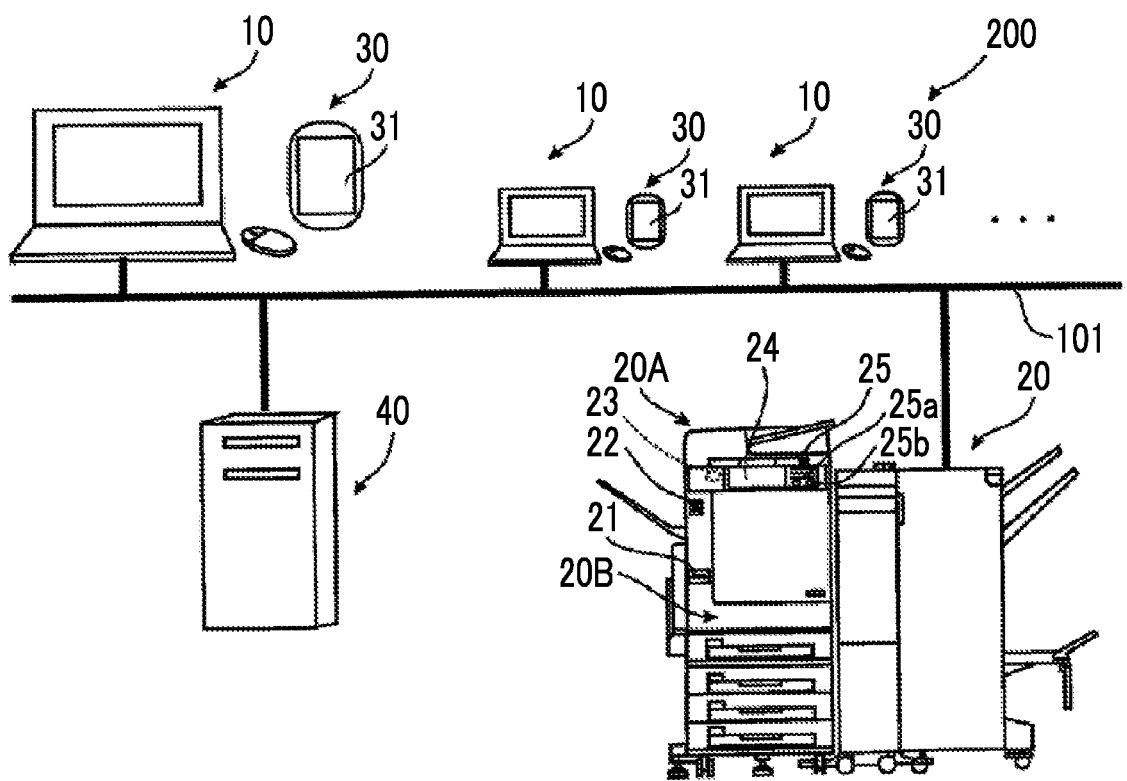
FIG. 13 is a diagram illustrating another example of the printing system.

FIG. 13 is a diagram illustrating another example of the printing system.

In a printing system 200 illustrated in FIG. 13 further includes a server 40 in addition to the respective components which form the printing system 100 illustrated in FIG. 1. The server 40 stores a user ID list, in which a user name and a user ID of a user who has authority to use each multi-function machine 20 are associated, for each multi-function machine 20 which forms the printing system 200 illustrated in FIG. 13.

In contrast, each multi-function machine 20 does not store the user ID list which indicates use authority for each multi-function machine 20.

Furthermore, in the printing system 200 illustrated in FIG. 13, in a case where the communication unit 204 receives the user ID from the mobile device 30, the authentication processing unit 207 (see FIG. 3) of each multi-function machine 20 causes the transmission/reception unit 201 to transmit the multi-function machine ID of the multi-function machine 20 and the received user ID to the server 40, thereby inquiring whether the user ID is a user ID of the user who has authority to use the multi-function machine 20. In a case where the server 40 receives the inquiry, the server 40 searches the user ID list, which is stored in the server 40 and is relevant to the querying multi-function machine 20, detects whether or not the same user ID as the inquired user ID exists in the user ID list, and respond a detection result to the querying multi-function machine 20. The multi-function machine 20, which performed the inquiry, recognizes the user who possesses the user ID is the user who has authority to use the multi-function machine 20 according to the response.

The server 40 corresponds to an example of an external device according to the exemplary embodiment of the invention.

Here, each exemplary embodiment is configured such that the user authentication process is executed only in a case where the user ID transmitted from the mobile device 30 is received. Therefore, in a case of the above-described exemplary embodiment, it is necessary for the user who attempts to use the multi-function machine 20 to carries the mobile device 30. A user authentication process (for example, user authentication process using password input, fingerprint authentication, an IC card, and the like) may be executed together by considering a user who does not possess the mobile device 30 or a user who considers that it does not matter even though hours are extended, for example, until the copy operation or the like starts after the user arrives at the place of the multi-function machine 20.

In addition, in each exemplary embodiment is configured such that it is necessary to execute the user authentication even in a case where any one of the process functions (scan, print, and copy), which is performed by the multi-function machine 20, is used. However, it is possible for anyone to use apart of the process functions without performing the user authentication. Even in a configuration in which it is necessary to perform the user authentication for remaining process functions, it is possible to apply the exemplary embodiment of the invention to the process function which requires the user authentication.

Furthermore, here, the multi-function machine 20 illustrated in FIG. 1 or the like is particularly described. However, the exemplary embodiment of the invention is not applied to only the multi-function machine 20 and it is possible to widely apply the exemplary embodiment of the invention to a processing apparatus which executes some processes, in which it is necessary to perform the user authentication, before the process is executed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A processing apparatus comprising:
   a process execution unit that executes a process according to a user instruction;
   a first communication unit that performs wireless communication with a mobile device which is moved in a predetermined communication area;
   a recognition unit that recognizes existence/non-existence of user intention in which a user attempts to cause the process execution unit to execute the process, wherein the recognition unit is configured to determine whether the user moves toward the processing apparatus, and in response to determining that the user moves toward the processing apparatus, the recognition unit causes the first communication unit to transmit the inquiry about the existence/non-existence of use intention to the mobile device which is moved in the predetermined communication area and to receive a reply to the inquiry from the mobile device, and recognizes the existence/non-existence of use intention based on the reply;
   an authentication processing unit that, in cases where the first communication unit receives a user ID maintained in the mobile device through communication with the mobile device and the recognition unit recognizes that the user who possesses the user ID attempts to cause the process execution unit to execute the process, executes a user authentication process of recognizing whether or not the user who has the reception user ID received by the first communication unit is a user who has authority to cause the process execution unit to execute the process for at least a part of necessary authentication process among processes which can be executed by the process execution unit; and
   a process execution permission unit that, in a case where the reception user ID is recognized by the authentication processing unit as the user ID possessed by the user who has the authority to cause the process execution unit to execute the necessary authentication process, permits the process execution unit to execute the necessary authentication process,
   wherein the authentication processing unit inquires of an external device, in which the user ID of the user who has the authority to cause the process execution unit to execute the necessary authentication process is registered, about whether or not the same user ID as the reception user ID received by the first communication unit is registered as the user ID of the user who has the authority to cause the process execution unit to execute the necessary authentication process, and permits the process execution unit to execute the necessary authentication process in a case where the reception user ID is recognized as the user ID possessed by the user who has the authority to cause the process execution unit to execute the necessary authentication process based on a response with respect to the inquiry, as the user authentication process.

2. The processing apparatus according to claim 1, further comprising:
   a first memory that stores the user ID of the user who has the authority to cause the process execution unit to execute the necessary authentication process,
   wherein the authentication processing unit determines whether or not the reception user ID received by the first communication unit is identical to any one storage user ID among user IDs stored in the first memory, and permits the process execution unit to execute the necessary authentication process in a case where the reception user ID is identical to the storage user ID, as the user authentication process.

3. The processing apparatus according to claim 2, wherein the recognition unit causes the first communication unit to transmit the inquiry about the existence/non-existence of use intention to the mobile device which is moved in the communication area and to receive a reply to the inquiry from the mobile device, and recognizes the existence/non-existence of use intention based on the reply.

4. The processing apparatus according to claim 1, wherein the recognition unit causes the first communication unit to transmit the inquiry about the existence/non-existence of use intention to the mobile device which is moved in the communication area and to receive a reply to the inquiry from the mobile device, and recognizes the existence/non-existence of use intention based on the reply.

5. The processing apparatus according to claim 2, further comprising:
   a detection unit that separately detects movement of the user according to whether the user passes by the processing apparatus or the user comes toward the processing apparatus,
   wherein the recognition unit recognizes that the user has the use intention by detecting that the user comes toward the processing apparatus by the detection unit.

6. The processing apparatus according to claim 1 further comprising:
   a detection unit that separately detects movement of the user according to whether the user passes by the processing apparatus or the user comes toward the processing apparatus,
   wherein the recognition unit recognizes that the user has the use intention by detecting that the user comes toward the processing apparatus by the detection unit.

7. The processing apparatus according to claim 1, further comprising:

an authentication result notification unit that causes the first communication unit to notify the mobile device, which is a current communication partner, of a result of the user authentication process in the authentication processing unit, through the wireless communication.

8. The processing apparatus according to claim 2, further comprising:

an authentication result notification unit that causes the first communication unit to notify the mobile device, which is a current communication partner, of a result of the user authentication process in the authentication processing unit, through the wireless communication.

9. The processing apparatus according to claim 1, further comprising:

an authentication result notification unit that causes the first communication unit to notify the mobile device, which is a current communication partner, of a result of the user authentication process in the authentication processing unit, through the wireless communication.

10. The processing apparatus according to claim 1, further comprising:

an authentication result notification unit that causes the first communication unit to notify the mobile device, which is a current communication partner, of a result of the user authentication process in the authentication processing unit, through the wireless communication.

11. The processing apparatus according to claim 3, further comprising:

an authentication result notification unit that causes the first communication unit to notify the mobile device, which is a current communication partner, of a result of the user authentication process in the authentication processing unit, through the wireless communication.

12. The processing apparatus according to claim 4, further comprising:

an authentication result notification unit that causes the first communication unit to notify the mobile device, which is a current communication partner, of a result of the user authentication process in the authentication processing unit, through the wireless communication.

13. The processing apparatus according to claim 1, further comprising:

an authentication result notification unit that causes the first communication unit to notify the mobile device, which is a current communication partner, of a result of the user authentication process in the authentication processing unit, through the wireless communication.

14. The processing apparatus according to claim 5, further comprising:

an authentication result notification unit that causes the first communication unit to notify the mobile device, which is a current communication partner, of a result of the user authentication process in the authentication processing unit, through the wireless communication.

\* \* \* \* \*